United States Patent
Chapman et al.

(10) Patent No.: US 6,522,421 B2
(45) Date of Patent: Feb. 18, 2003

(54) METHOD AND APPARATUS FOR AUTOMATICALLY COMMUNICATING RETURNING STATUS AND INFORMATION FROM A PRINTER USING ELECTRONIC MAIL (EMAIL).

(75) Inventors: Edward N. Chapman, Rochester, NY (US); Michael P. Tompkins, Chili, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/181,104

(22) Filed: Oct. 28, 1998

(65) Prior Publication Data

US 2002/0057449 A1 May 16, 2002

(51) Int. Cl.[7] .............................................. G06F 15/00
(52) U.S. Cl. ...................... 358/1.15; 358/402; 358/434; 358/436
(58) Field of Search .................. 358/1.1, 1.12, 358/1.13, 1.14, 1.15, 401, 402, 405, 407, 434, 436, 438, 442, 296; 379/93.24, 93.23

(56) References Cited

U.S. PATENT DOCUMENTS

| | | | |
|---|---|---|---|
| 5,047,955 A | 9/1991 | Shope et al. | 358/1.12 |
| 5,115,326 A | 5/1992 | Burgess et al. | 358/440 |
| 5,437,024 A | 7/1995 | French | 707/10 |
| 5,486,686 A | 1/1996 | Zdybel, Jr. et al. | 707/541 |
| 5,657,461 A | 8/1997 | Harkins et al. | 345/333 |
| 5,701,451 A | 12/1997 | Rogers et al. | 707/1 |
| 5,713,032 A * | 1/1998 | Spencer | 707/515 |
| 5,715,393 A | 2/1998 | Naugle | 709/206 |
| 5,745,754 A | 4/1998 | Lagarde et al. | 707/102 |
| 5,778,054 A | 7/1998 | Kimura et al. | 379/93.23 |
| 5,790,793 A | 8/1998 | Higley | 707/513 |
| 5,793,498 A | 8/1998 | Scholl et al. | 358/434 |
| 5,872,569 A * | 2/1999 | Salgado et al. | 399/82 |
| 6,028,982 A * | 2/2000 | Toyoda et al. | 358/1.15 |
| 6,052,198 A * | 4/2000 | Neuhard et al. | 358/1.15 |
| 6,088,125 A * | 7/2000 | Okada et al. | 358/405 |
| 6,130,760 A * | 10/2000 | Nickerson | 358/442 |

* cited by examiner

Primary Examiner—Mark Wallerson
(74) Attorney, Agent, or Firm—James D. Leimbach

(57) ABSTRACT

A method and apparatus automatically communicating status information relative to a document production job by a printer. An application file is provided that includes information to be reproduced as a document reproduction job. Preferably, the application file is encoded with a document description language. E-mail address information is embedded in the application file relating to the party or parties to receive the status information. The application file is sent to the printer. At the printer, the email address is detected. The application file is processed to produce a printed document and an email message is sent from the printer relative to the status of the document reproduction job.

18 Claims, 2 Drawing Sheets

METHOD AND APPARATUS FOR AUTOMATICALLY COMMUNICATING RETURNING STATUS AND INFORMATION FROM A PRINTER USING ELECTRONIC MAIL (EMAIL).

FIELD OF THE INVENTION

This invention relates generally to digital printing systems which take structured electronic documents defined in accordance with a document description language and convert the documents into a format (e.g. raster) understood by the marking engine which places marks on a media such as paper to provide hard copy output of the documents.

BACKGROUND OF THE INVENTION

In order to provide for the communication of electronic documents between a computer or other document creation source, the documents may be prepared in accordance with a known encoding scheme. One such encoding scheme is known as ASCII. The ASCII encoding scheme however is of limited utility for representing structured electronic documents. Thus, other encoding formats have been created to provide fuller structural representations of electronic documents. Some of the more basic document description languages (DDLs) employ embedded control codes for supplementing ASCII encodings with variables define the logical structural (i.e., the sections, paragraphs, sentences, figures, figure captions, etc.) of electronic documents, thereby permitting such documents to be formatted in accordance with selected formatting variables such as selected font styles, font sizes, line and paragraph spacings, margins, indentations, header and footer locations and columns. Graphical DDL codings provide more sophisticated and complete representations of electronic document structures because they encode both the logical structure and the layout structure of such documents. Page description language (PDL) encodings are related to graphical DDL encodings but they are designed so that they can be readily decomposed or interpreted to define the detailed layout of the printed page in a raster scan format. Examples of PDL's are Postscript™, PCL™, PCL™, PDF™, Interpress™ or HTML, Document files may also be formatted in TIFF, JPEG or GIF which are examples of image formats.

It is also well known to send status and information over a network. Printers such as the Apple™ LaserWriter return information and status over standard bidirectional communications such as Apple-Talk™. Examples of information and status are PostScript™ Errors and that the printer is out of paper. This information isn't returned when the communications channel isn't bidirectional or when a print server such as the Kodak LionHeart System™ is between the printer and the computer that submitted a print job. Other printer protocols such as line printer (lpr) give status that the print job is sent but not how or if a print job has been completed.

SUMMARY OF THE INVENTION

The present invention is intended to address the above mentioned problems with returning status and information with non-bidirectional printer protocols and print servers or otherwise where the status information returned is lacking information such as an indication that the print job is completed. The method of doing this involves embedding email information within an application file prior to sending it to the printer. The printer has special software to interpret this email information and the status and information is then sent out to the users specified via email.

DETAILED DESCRIPTION OF THE PREFERRED EMBODIMENT

The present description will be directed in particular to elements forming part of, or cooperating more directly with, apparatus in accordance with the present invention. It is to be understood that elements not specifically shown or described may take various forms well known to those skilled in the art.

Figure 1:
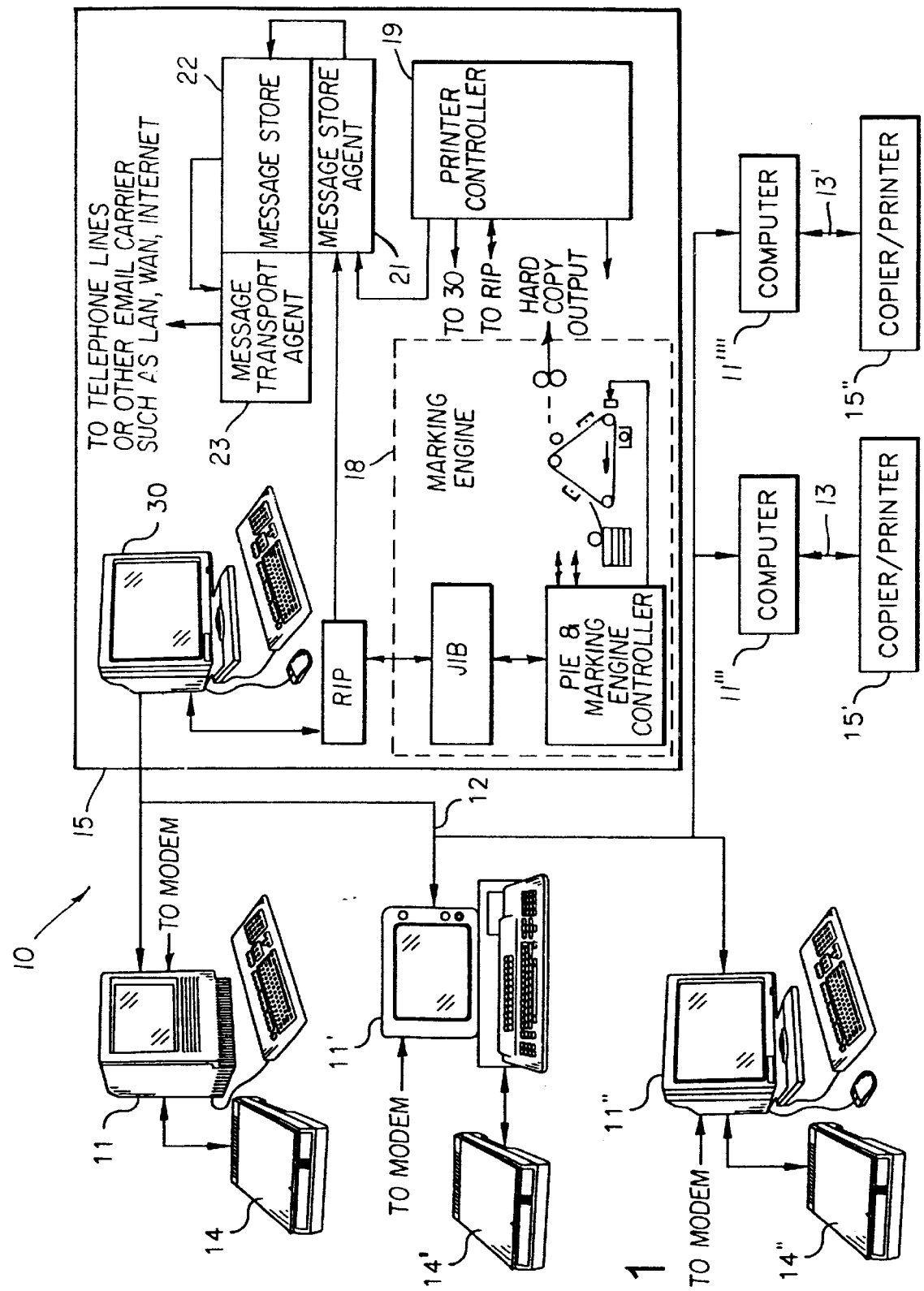
FIG. 1 is a block diagram of a networked printer system in accordance with the invention.

FIG. 1 shows a block diagram of a typical networked printer system 10 in accordance with the invention. The computer workstations 11, 11' and 11", 11''', 11'''' in this diagram may be of various types such as the Apple Macintosh™, Sun Microsystems™ workstations, or IBM™ personal computers. Each computer workstation may have a respective document scanner 14, 14', 14" associated with it. The workstations are connected together on a standard network 12 such as Ethernet which allows for the sharing of data between the computers on the network. One or more printers 15, 15', 15", each consisting of a minimum of a raster image processor (RIP) to convert document description language and preferably page description languages to rasters and a marking engine to place marks, i.e., print information, on media, may be connected on the network 12. One or more of the printers 15, 15' 15" may also be connected to other networks (13, 13') such as EtherTalk™. Print jobs may be sent to the printer 15 over the networks 12, 13, 13' using printer protocols such as line printer or Appletalk™. A print server 30 may form a part of the printer to function as a spooler to buffer jobs sent to the printer. Associated with a server may be an operator control panel and keyboard. With reference to the printer 15 a raster image processor (RIP) receives files from the print server 30 and functions as a page description language decomposer for converting the PDL files; e.g. Interpress™ or Postscript™ other PDLs noted above to bitmapped files for application to the marking engine 18 of the printer. The document files may also be formatted in TIFF, JPEG, or GIF as examples of image formats. The marking engine provides hard copy output of the information input from the various sources. The rasterized files may be stored in a multipage job buffer (JIB) as taught in U.S. Pat. No. 5,047,955. When ready to print data is sent to the printer's interface electronics (PIE) and output to the image forming part of the marking engine. The marking engine may record images on plain paper or plastic using electrostatography such as electrophotography or electrography or be a thermal, or inkjet printer or other printer. A controller having one or more microprocessors is arranged to perform arithmetic and logic operations and instruction decoding for operation of the marking engine as well as controlling the time allocation of peripherals (such as a paper supply controller and accessories) through a machine control communications link. Several output functions may be available for receiver sheets including selection of output trays, stapling, sorting, folding, finishing, mailbox, envelope receiver, etc. Programming of a number of commercially available microprocessors is a conventional skill well understood in the art. This disclosure is written to enable a programmer having ordinary skill in the art to produce an appropriate control program for the microprocessor(s).

Figure 2:
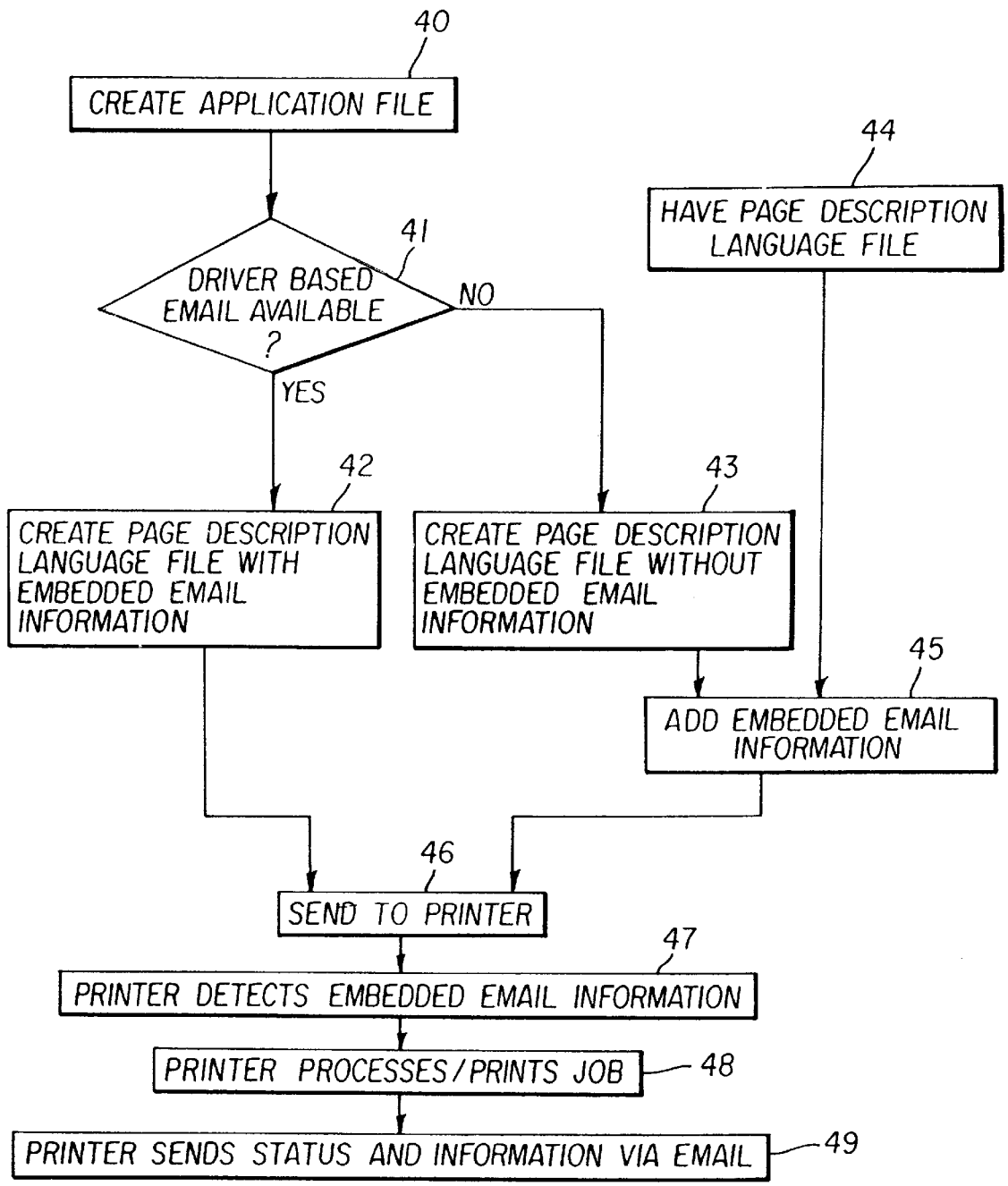
FIG. 2 is a flowchart of a method of automatically returning status and error information from a printer using electronic mail in accordance with the invention.

FIG. 2 shows a flowchart of a method of automatically returning status and error information from a printer using email. Creating an application file (step 40) can be done with many software packages available on a computer such as a word processor like Microsoft Word™ or a painting type program such as Adobe Photoshop™. Even a simple application which does a screen dump may be used. Printers typically require Page Description Languages, so the application file may be transformed into a Page Description File format prior to being sent to a printer. E-mail information may be embedded (see example 1) during this transformation if the driver (step 41) supports it and a file with embedded email information (step 42) can be sent to the printer. Typically, the email information includes a user ID and a domain name which together comprise an email address. Other information embedded in the file at this time may direct the printer to for example add a finishing feature such as staple, or select different medias; i.e., copy sheets, to print on. If the driver doesn't support it (step 43) a page description file is created without the embedded email information. This file (step 43) or a legacy or archived page description file (step 44) may have embedded email information placed in the file (see examples 2 and 3) with a downloader (step 45) program such as the Kodak LionHeart Sun Client™. This file is sent from the computer 11 or the other shown document creation computers over the network 12, 13 or 13' to the appropriate printer (step 46) with standard printer protocols.

The printer receives the file and starts interpreting the page description language. It detects this embedded email information (step 47) and extracts the email addresses. A program stored in memory in the printer for detecting embedded email information is provided in the appendix. The printer continues interpreting the page description file (step 48) until completion. It marks or prints 0 or more pages of media depending upon the page description file. Status and information are emailed to the extracted email addresses (step 49). See example 4 below for one exemplary detailed listing or message of the status and information returned via email by the printer to the address indicated in the example. The message includes information such as finishing options requested and used, pages printed, job completion or cancellation status. The email message may be formatted in one of various forms such as PostScript™, HTML or ASCII. The person who submitted the print job knows, upon receiving the email messages, when the job is completed and doesn't have to check on it. The email message may be sent over a LAN or WAN network or the internet. Various protocols may be used for the email message including SMTP, UUCP, POP or IMAP. The email message can be sent to a smart mail host and routed through various hosts to the final destination or can be sent directly to the workstation. Alternately, the email message or electronic mail may be transmitted by telephone lines to computers that are coupled to the printers by a fax modem or modem and specifically to the computers designated in the embedded address. The printer may include a computer controller that can send and receive a stream of bytes of compressed data representing an image. The fax modem converts audio signals on the telephone lines into one of the CCITT formats that represents an image undergoing facsimile transmission. The controller may include a fax server that can serve plural fax modems on a Local Area Network (LAN), a wide area network (WAN) or other electronic mail (email) system such as telephone lines. When the data is input from the server 30 to the RIP, the RIP strips the embedded email address information and the RIP provides status information relative to raster image processing of the document such as PDL errors and outputs the email address and this status information to a message store agent in the printer. The message store agent also receives an output of the printer controller representing various information concerning the printing of the document job associated with that address. The message store agent combines the address and information relative to the finished job in a message store. The message is then output to a message transport agent which outputs the message via telephone lines or other communication link, which could be wireless to, for example, a fax server allowing the person who sent the file to be printed to receive the email message that the job is complete and the nature of the finishing operation.

The invention has been described in detail with particular reference to preferred embodiments thereof, but it will be understood that variations and modifications can be effected within the spirit and scope of the invention.

What is claimed is:

1. A method of automatically communicating status information relative to a document production job by a printer, the method comprising:

providing a printing system with an interface to receive an application file containing the document production job, the printing system having the printer operatively coupled to a server, the server being operatively coupled to a raster image processor within the printing system and a device for recognizing E-mail addresses contained within the application file that includes information to be reproduced as the document reproduction job;

secondly providing at least one computational element coupled to the interface;

wherein, once the application file is sent to the printing system traverses from the server to the raster image processor no status of the document production job is available to the computational element;

determining, within the computational element, if driver based E-mail is available within the application file;

responding to the determining step, within the computational element, and embedding E-mail address information in the application file relating to at least one party to receive status information if the determining step identifies that no driver based E-mail is available within the application file;

sending the application file to the printing system;

detecting the E-mail information at the printing system;

processing the application file to produce a printed document; and sending an E-mail message from the printing system to the computational element relative to the status of the document reproduction job.

2. The method of claim 1 wherein the application file is encoded as a page description language (PDL) file.

3. The method of claim 2 wherein the email address is added by a downloading program to the application file.

4. The method of claim 2 and including adding an email address to a previously formed PDL file.

5. The method of claim 1 wherein the application file is a TIFF file.

6. The method of claim 1 wherein status information is communicated by email to an email address comporting with the email address information during or after production of the job.

7. The method of claim 1 wherein the application file includes document description language encodings associated with the information to be reproduced.

8. A memory suited for use in the method of claim 2 and storing a set of computer instructions for detecting an embedded email address in application files encoded as a page description language file.

9. A printer system comprising:

at least one computational element;

a marking engine;

a printer server including a storage mechanism for storing application files of documents, and an interface to the computational element that can receive an application file from the computational element;

a raster image processor within the printer server for converting application files to rasterized form for the marking engine, such that communication with the computational elements regarding status of the application file is lost once delivered to the raster image processor;

means, within the computational element, for determining if driver based E-mail is available and embedding E-mail information if driver based E-mail is not available;

a device, within the server, for recognizing an E-mail address concatenated with an application file and for associating the address with the status of the printing of the application file; and means for transmitting an E-mail message to the E-mail address, the message identifying status with regard to printing of the application file.

10. The printer of claim 9 wherein the application file includes document description language encodings associated with the information to be reproduced.

11. A printing system product for automatically communicating status information relative to document job production by a printer comprising the steps of:

providing the printing system with an interface to receive an application file containing the document production job, the printing system a server, a raster image processor and a device for recognizing E-mail addresses contained within an application file that includes information to be reproduced as a document reproduction job, the server being operatively coupled to a printer within the printing system;

secondly providing at least one computational element coupled to the interface;

wherein, once the application file is sent to the printing system traverses from the server to the raster image processor no status of the document production job is available to the computational element;

determining, within the computational element, if E-mail is embedded within the application file;

responding to the determining step within the computational element and embedding E-mail address information in the application file relating to at least one party to receive status information if the determining step identifies that E-mail is not already embedded within the application file;

sending the application file to the printer;

detecting the E-mail information at the printer;

processing the application file to produce a printed document; and sending an E-mail message from the printer to the party relative to the status of the document reproduction job.

12. The product of claim 11 wherein the application file is encoded as a page description language (PDL) file.

13. The product of claim 12 wherein the email address is added by a downloading program to the application file.

14. The product of claim 12 and including adding an email address to a previously formed PDL file.

15. The product of claim 11 wherein the application file is a TIFF file.

16. The product of claim 11 wherein status information is communicated by email to an email address comporting with the email address information during or after production of the job.

17. The product of claim 11 wherein the application file includes document description language encodings associated with the information to be reproduced.

18. A memory suited for use in the product of claim 12 and storing a set of computer instructions for detecting embedded email addresses in an application file encoded as a page description language file.

* * * * *